United States Patent [19]

Sackmann et al.

[11] Patent Number: 5,131,092
[45] Date of Patent: Jul. 14, 1992

[54] COMMUNICATION SYSTEM ENABLING PROGRAMMABLE LOGIC CONTROLLERS ACCESS TO HOST COMPUTER TASKS AND HOST COMPUTER ACCESS TO PROGRAMMABLE LOGIC CONTROLLERS WITHOUT POLLING

[75] Inventors: David J. Sackmann, Milwaukee; Brian T. Hill, Mequon; Joseph T. Bronikowski, Milwaukee; Mark S. Weber, Germantown, all of Wis.

[73] Assignee: Square D Company, Palatine, Ill.

[21] Appl. No.: 402,482

[22] Filed: Sep. 1, 1989

[51] Int. Cl.$^5$ ............................................. G06F 13/00
[52] U.S. Cl. ..................................... 395/800; 364/147; 364/940.9; 364/931.4; 364/926.9; 364/965.9; 364/DIG. 1; 364/DIG. 2
[58] Field of Search ... 364/200 MS File, 900 MS File, 364/132, 136, 147

[56] References Cited

U.S. PATENT DOCUMENTS

| | | | |
|---|---|---|---|
| 4,851,988 | 7/1989 | Trottier et al. | 364/200 |
| 4,897,777 | 1/1990 | Janke et al. | 364/900 |
| 4,969,083 | 11/1990 | Gates | 364/147 |
| 5,038,318 | 8/1991 | Roseman | 364/900 |

Primary Examiner—Thomas C. Lee
Assistant Examiner—William M. Treat
Attorney, Agent, or Firm—Michael J. Femal; Thomas K. Stine

[57] ABSTRACT

A high speed control system allows for transferring messages between a programmable logic controller and a host computer over an Ethernet communications network. The host computer includes prioritized alarm queues for receiving prioritized alarms from the programmable logic controller. Alarms fall into either a local or a global category, and each category supports three types of alarms: warnings, alerts or faults. The system is responsive to the routing address for transferring the messages between the programmable logic controller and the host computer. The host computer can immediately obtain messages from a programmable logic controller without interruption of the execution of its ladder program. The host computer can also receive unsolicited messages from the programmable logic controller. The programmable logic controller can communicate with tasks within the host computer as though those tasks were other programmable logic controllers.

9 Claims, 2 Drawing Sheets

COMMUNICATION SYSTEM ENABLING PROGRAMMABLE LOGIC CONTROLLERS ACCESS TO HOST COMPUTER TASKS AND HOST COMPUTER ACCESS TO PROGRAMMABLE LOGIC CONTROLLERS WITHOUT POLLING

DESCRIPTION

1. Technical Field

Applicants' invention relates to microprocessor based devices and, more particularly, to an apparatus for networking programmable logic controllers, and other microprocessor based devices to host computers.

2. Related Applications

This application is related to commonly assigned co-pending applications, Ser. No. 179,674 now U.S. Pat. No. 4,897,7 for "Peer-to-Peer Register Exchange Controller for PLCs", Ser. No. 179,743, now U.S. Pat No. 5,023,770 for "High-Speed Press Control System", Ser. No. 179,756 for "Network, Interface Board System" and Ser. No. 258,779 now U.S. Pat. No. 4,992,926 for "Peer-to-Peer Register Exchange Controller for Industrial Programmable Controllers".

BACKGROUND PRIOR ART

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

As industrial automation advances, interconnectivity between various microprocessor based plant floor devices, such as programmable logic controllers ("PLCs") and put computers, becomes more and more desirable. Various schemes have been developed to interconnect PLCs and host computers, but their applications have been limited.

For example, if one wanted to communicatively couple three PLCs in the absence of a network, each PLC would typically require a separate serial, or point to point, connection with the other two PLCs. The speed of serial communication is limited. Further, as the number of interconnected PLCs grows linearly, the number of serial connections grows geometrically.

In one of the above-incorporate co-pending patent application Ser. No. 258,779 now U.S. Pat. No. 4,992,926, peer-system is disclosed for interconnecting a plurality of PLCs. However this system requires a dedicated network.

Allen-Bradley Company, Inc., in conjuction with Digital Equipment Corportion ("DEC") has developed a system marketed under the trade name "Pyramid Integrator" for interconnecting devices over the relatively standardized Ethernet network via DEC's VAX computer. However according to this system, only up to four PLCs can be coupled to an Ethernet network per VAX computer, and each of the PLCs must be plugged into the backplane of the VAX computer. If five PLCs are needed on the Ethernet, two VAX computers are required. This can greatly add to the expense of automation.

In addition as is well known, host computers concurrently perform a plurality of applications programs, or tasks. When a PLC is connected to such a host computer, it is often important for the host computer to obtain data from the PLC. Typically this is accomplished by having the host computer poll the PLCs. However, this polling either requires the host computer to interrupt the PLC's processing of its ladder program or it requires the host computer to wait for the PLC to complete a scan of its ladder program. Further it is often important for the PLC to send unsolicited information to the host computer.

Data typically is transmitted between microprocessor based devices on an Ethernet network in the form of data packets. The packets generally include a preamble portion comprising routing information and protocol type, a user defined portion comprising the message itself, and an error detection portion. As the speed of communication between microprocessor based devices increases, error detection becomes more and more critical. Typically the error detection views the entire data packet to determine existence of an error. This often does not detect errors in the user data portion alone. Further, the protocol often cannot accurately respond to lost messages.

Finally as automated systems control ever larger operations, handling and prioritizing of event notifications or alarms, such as faults, alerts and warning, by the host computers becomes more important. While certain host computers have been able to receive alarms, they have been received on a global basis, rather than individually on a task basis.

Applicants' invention is provided to solve these and other problems.

SUMMARY OF THE INVENTION

It is an object of the invention to provide an apparatus for interconnecting PLCs and other microprocessor based devices over a high speed network such as Ethernet.

It is a further object of the invention to provide a system wherein a host computer can immediately obtain data from a PLC without interrupting execution of the PLC's ladder program and wherein the host computer can receive unsolicited information from the PLC.

It is a still further object of the invention to provide a communication protocol including error detection of the user data portion alone, but which is operable at a high speed.

It is yet another object of the invention to provide a communication protocol which can accurately respond to lost messages.

Finally it is an object of the invention to provide a system which prioritizes alarms, such as faults, alerts and warnings, while also allowing for an essentially unlimited number of alarms per queue.

Other features and advantages of the invention will be apparent from the following specification taken in conjunction with the following drawing.

DETAILED DESCRIPTION

Figure 1:
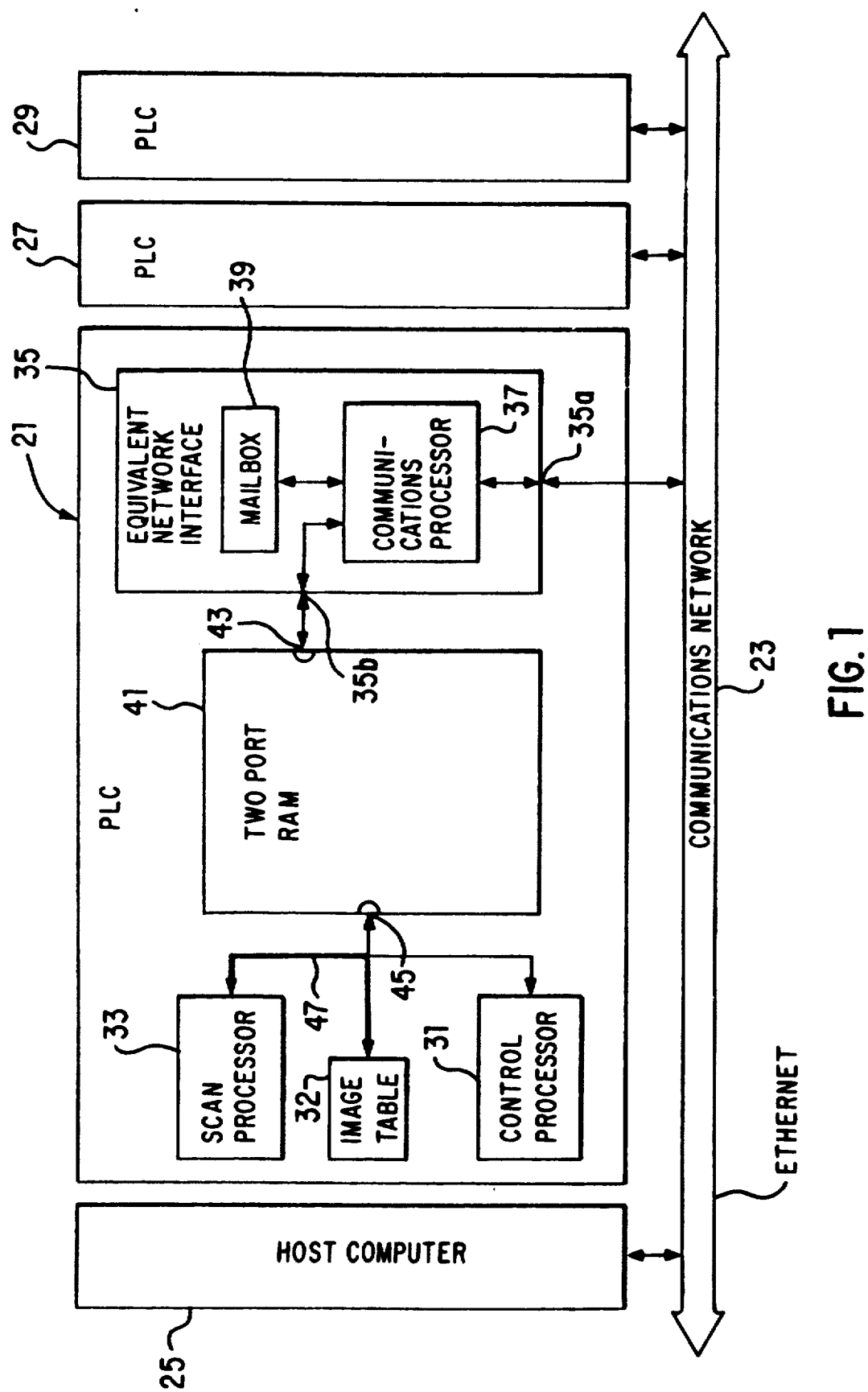
FIG. 1 is a block diagram of a plurality of microprocessor based devices coupled to a high-speed communications network.

A first programmable logic controller ("PLC") 21 coupled to an high-speed communications network 23 is illustrated in FIG. 1. Other microprocessor based devices such as a host computer 25 or other microprocessor based devices 27, 29 can be coupled to the communications network 23. In the preferred embodiment, the host computer 25 is a VAX computer, sold by the Digital Equipment Corporation.

The communications network 23 comprises a Thin Wire Ethernet (Type 10BASE2) 10Mbaud network. The VAX computer can couple directly to the Thin Wire Ethernet network with an appropriate Thin Wire Ethernet interface (not shown), or it can attach to a standard Ethernet (Type 10BASE5) network which is then connected through a repeater (not shown) to the Thin Wire Ethernet network.

The first PLC 21 includes a control processor 31 (Motorola 68010), an image table 32 and a scan processor 33 (AMD 29116). Traditionally PLCs have required a separate network interface module ("NIM") in order to communicate on a high-speed communications network such Ethernet. In accordance with one aspect of the invention, the first PLC 21 includes an equivalent network interface module, or E-NIM, 35. The E-NIM 35 comprises a communications processor 37 (Motorola 68010) and random access memory operable as an E-NIM mailbox 39. As discussed below, the E-NIM 35 is coupled to the communications network 23 via a first port 35a.

A two-port RAM 41 has first and second ports 43, 45, respectively. The first port 43 is coupled to the E-NIM 35. The second port 45 is coupled to a data bus 47. The data bus 47 is also coupled to the control processor 31, the image table 32 and the scan processor 33. The control processor 31 accesses the two-port RAM 41 via the data bus 47. The control processor 31 transfers data to the image table 32, which is accessed by the scan processor 33. Thus, the E-NIM 35 and the control processor 31 pass data via the two-port RAM 41. The mailbox 39 provides random access registers to permit the first PLC 21 to receive unsolicited messages from other devices coupled to the communication network 23 without affecting scan time. Unsolicited messages can also be received in the image table 32.

Figure 2:
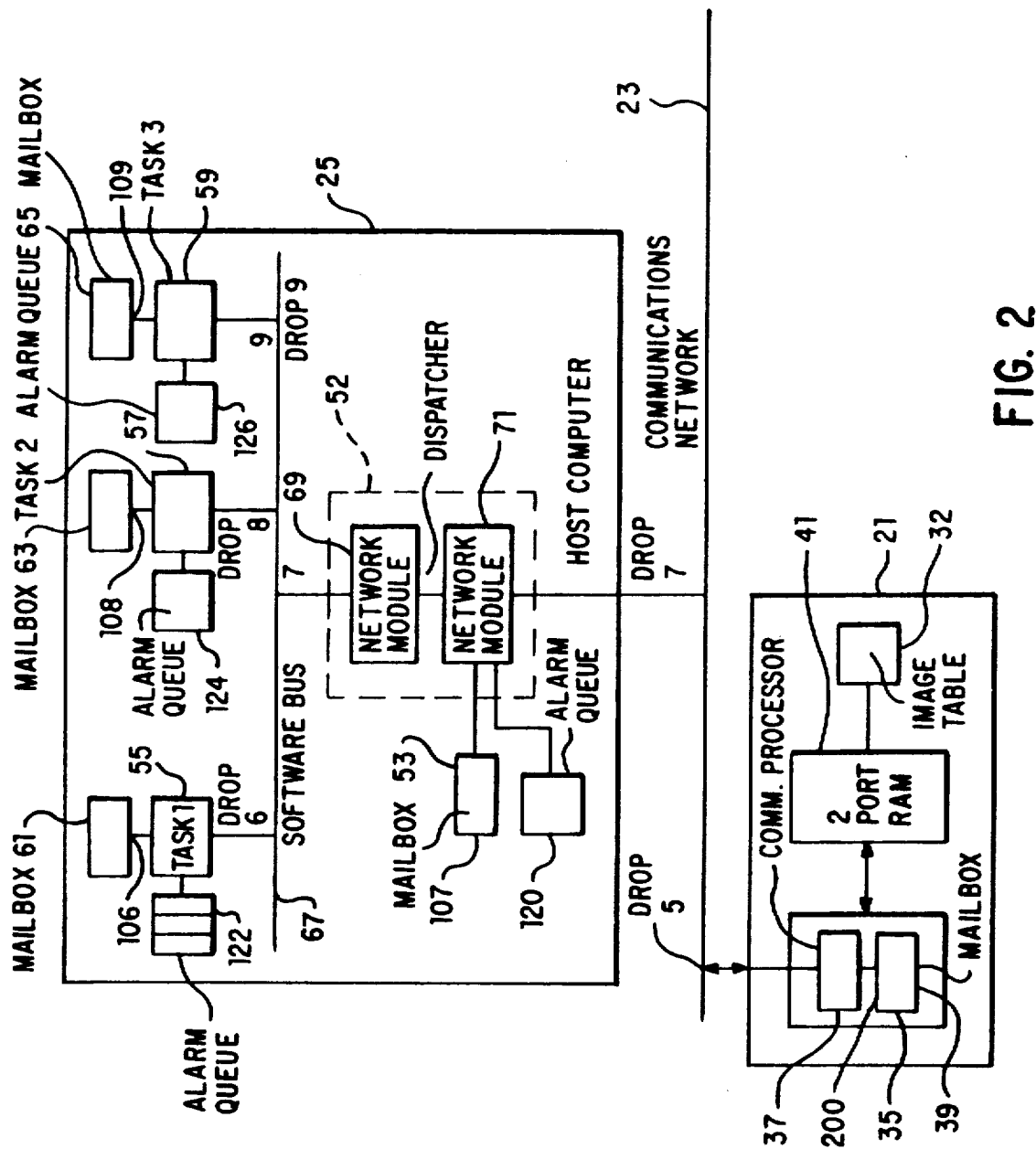
FIG. 2 is a more detailed block diagram illustrating software architecture of a host computer and a PLC, each coupled to a high-speed data communications network.

Software architecture of the host computer 25 is illustrated in FIG. 2.

As indicated above, traditionally a PLC required a network interface module (NIM) to communicate over a high-speed communications network. Such NIMs typically have only a single high-speed port adaptable to communicatively couple to the network, and a serial port. Thus, in order to couple two networks, two NIMs were required so that each of the two high-speed ports could be coupled to a respective one of the networks. The two NIMs would then be jointly coupled by their serial ports. The host computer 25 is provided with software architecture including a network (net-to-net) software bridge which permits PLCs and other similar devices coupled to a network to communicate with a host computer also coupled to the network, both on a global, as well as task, level.

Host computers have been able to poll specific PLCs coupled thereto for information. However, these traditional host computers have been unable to obtain unsolicited messages from a PLC. Further, as is well known, host computers typically concurrently run a plurality of tasks. Sometimes it is desirable for unsolicited information from a PLC to be available for each of the host computer tasks. At other times, it is desirable that the unsolicited information be available for only one, or a limited number, of the tasks.

Accordingly, the host computer 25 illustrated in FIG. 2 includes software architecture comprising a dispatcher 52, a global mailbox 53, first, second and third tasks 55, 57 and 59, respectively. Each of the first, second and third tasks, 55, 57 and 59 includes respective first, second and third tasks mailbox 61, 63, 65. Each of the first, second and third tasks 55, 57, 59 is coupled to the dispatcher 52 by a software bus 67. The dispatcher 52 includes first and second network modules 69, 71 which cooperate as a network bridge between the communications network 23 and the software bus 67. As discussed below, the first network module 69 and second network module 71 emulate two back-to-back hardware NIMs which traditionally had been used to couple two networks, thus permitting the PLCs to communicate with the tasks as though they were just other PLCs.

As discussed below, if an unsolicited message is to be available for each of the tasks 55, 57, 59, the message is routed to and stored in, the dispatcher mailbox 53. However, if the message is only for one of the tasks, such as the first task 55, the message would be directed to the first task mailbox 61. Similarly, if the message is for a limited number, though not all, of the tasks, the message would be sent to the mailboxes of the limited number of tasks. Similarly, the first PLC 21 or other similar devices on the communications network 23 can also obtain data from the individual task mailboxes 61, 63, 65, or the dispatcher mailbox 53.

Devices on a network are located at "drops". In order to route a message, the message includes routing information indicating where the data is from, where it is going and the path for it to get there. For example, the first PLC 21 is located on the communication network 23 at drop 5, and the host computer 25 is located on the communications network 23 at a drop 7. The first task is assigned drop 6, the second task is assigned drop 8, and the third task is assigned drop 9. A global mailbox is assigned a number of 100 plus the drop number of its respective device. A task mailbox is assigned the drop number of its respective device. For example, the first task mailbox 61 is off of drop 6. Therefore, it has the address of 6.

Two locations in the first PLC 21 are able to receive and/or obtain data, that being the mailbox 39 and the image table 32. In order to route information from the two-port RAM 41 to the global mailbox 53, one uses the routing address (5, 107). The number "5" represents the origination of the data, being the device coupled to drop number "5". The number "107" is the address of dispatcher mailbox 53. The mailboxes of the individual PLCs, such as the mailbox 39 of the first PLC 21, are assigned the address "200". When routing data to a particular E-NIM mailbox, the number 200 precedes the drop number of its respective drop. For example, if data is to be transferred from the first task 55, to the mailbox 39, the routing would be (6, 7, 200, 5). The number "6" indicates the origination of the message, being the drop number of the first task 55. The number "7" represents the exit from the software bus 67, the 200 indicates that the data is going to a PLC mailbox, and the number 5 indicates that it is the PLC mailbox of the PLC coupled to drop number 5.

The present invention also provides for prioritization and response to alarms by the host computer 25, both on the global level as well as on the task level. Alarms on the global level are accessible from any task, while alarms on the task level are only accessible by that particular task.

Accordingly the dispatcher 52 is provided with three alarm queues, specifically a fault alarm queue 120a for fault alarms, an alert alarm queue 120b for alert alarms and a warning alarm queue 120c for warning alarms, the alarm queues for receiving event notifications of the three respective levels of descending priority. In addition, each of the first, second and third tasks 55, 57 and 59 includes three similar alarm queues, 122a,b,c, 124a,b,c and 126a,b,c, respectively.

Each of the queues can receive an alarm of up to 128 registers (16 bit registers) long. An alarm queue entry contains the following information:
1. time received by the host computer 25;
2. origination of message;
3. level of alarm (ie. fault alarms, alert alarms and warning alarms;
4. a user specified alarm code; and
5. user specified data.

The number of alarms per queue is determined by the user, depending upon an anticipated number of alarms as well as available memory.

Each of the tasks can perform the following functions in response to alarms in their own queues as well as the global queue:
1. Read first alarm-get alarm data for 1st (oldest) alarm in a queue;
2. Read specific alarm-get alarm data for an alarm, specified by the alarm's reference number, in a queue;
3. Read next alarm-get alarm data for the alarm with a reference number greater than (i.e., newer than) the reference number specified;
4. Clear alarm-delete an alarm from a queue;
5. Clear and acknowledge alarm-acknowledge and delete an alarm from a queue;
6. Clear all alarms-delete all alarms from a queue;
7. Clear and acknowledge all alarms-acknowledge and delete all alarms from a queue;
8. Set alarm notify-set up for task notification on addition/deletion of an alarm to/from a queue; and
9. Read alarm queue information-get information about an alarm queue.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:
1. A high speed industrial control system comprising:
(a) a high speed data communications network;
(b) a plurality of programmable logic controllers each of said programmable logic controllers executing a ladder program and including
a data bus,
a scan processor coupled to said data bus for executing said ladder program,
a control processor coupled to said data bus,
an equivalent network interface module having a communications processor, said communications processor for sending messages from said programmable controller to said communications network and receiving messages from said communications network, a random access mailbox and a first port, said first port coupled to said high speed communications network, and a multi-port RAM having a first port coupled to said equivalent network interface module and a second port coupled to said data bus;
(c) a host computer communicatively coupled to said high speed communications network, said host computer including
means for executing a plurality of programs responsive to said messages from said programmable logic controller,
a plurality of tasks, one of said tasks associated with a respective one of said programs, each of said tasks including a respective mailbox for receiving unsolicited ones of said messages from said programmable logic controller for said particular task,
a dispatcher communicatively coupled between said high speed data communications network and said tasks, and
a global mailbox coupled to said dispatcher, said global mailbox for receiving unsolicited ones of said messages from said programmable logic controller directed to said global mailbox for use by any of said tasks;
(d) wherein said programmable logic controller can communicate with said host computer's plurality of tasks as though said tasks were other programmable logic controllers coupled to said communication network; and
(e) wherein said host computer can receive said messages from said programmable logic controller without polling said programmable logic controller.

2. The control system of claim 1 wherein said high speed communications network comprises an Ethernet network.

3. The control system of claim 1 wherein said programmable logic controller further includes an image table coupled to said data bus for storing messages accessible by said scan processor.

4. The control system of claim 3 wherein said control processor transfers messages between said image table and said equivalent network interface module, allowing said image table to be accessible to receive messages from said communications network, thereby allowing said programmable logic controller to receive said messages without interrupting the execution of said ladder program by said scan processor.

5. The control system of claim 1 wherein said host computer comprises a VAX computer.

6. The control system of claim 1 wherein said dispatcher in said host computer includes a first network module coupled to a second network module which cooperate to form a network bridge between said host computer and said communications network and said dispatcher controlling transferring of messages between said system task and said user tasks in said host computer and said programmable logic controllers devices connected on said communications network.

7. The control system of claim 6 wherein said messages include a routing address specifying an originating drop number and a destination drop number and a routing path drop number.

8. The control system of claim 6 wherein said messages could constitute prioritized alarms, said alarms stored in said global mailbox in said dispatcher for global alarms and stored in a task mailbox for alarms directed to a specific task.

9. The alarms of claim 8 wherein said alarms are stored in one of three alarm queues in said global mailboxes or said task mailboxes, said alarm queues being specifically a fault alarm, an alert alarm, or a warning alarm.

* * * * *